United States Patent
Jallouli et al.

(10) Patent No.: US 10,114,234 B2
(45) Date of Patent: *Oct. 30, 2018

(54) TRANSPARENT OPTICAL ARTICLE HAVING A REDUCED YELLOWNESS APPEARANCE

(71) Applicant: ESSILOR INTERNATIONAL (COMPAGNIE GENERALE D'OPTIQUE), Charenton-le-Pont (FR)

(72) Inventors: Aref Jallouli, Dallas, TX (US); Haifeng Shan, Dallas, TX (US); Gilles Baillet, Charenton-le-Pont (FR)

(73) Assignee: ESSILOR INTERNATIONAL (COMPAGNIE GENERALE D'OPTIQUE, Charenton-le-Pont (FR)

( * ) Notice: Subject to any disclaimer, the term of this patent is extended or adjusted under 35 U.S.C. 154(b) by 115 days.

This patent is subject to a terminal disclaimer.

(21) Appl. No.: 15/107,743

(22) PCT Filed: Dec. 23, 2013

(86) PCT No.: PCT/IB2013/003002
§ 371 (c)(1),
(2) Date: Jun. 23, 2016

(87) PCT Pub. No.: WO2015/097492
PCT Pub. Date: Jul. 2, 2015

(65) Prior Publication Data
US 2016/0320638 A1    Nov. 3, 2016

(51) Int. Cl.
*G02C 7/10*    (2006.01)
*G02B 1/04*    (2006.01)
*G02B 1/10*    (2015.01)

(52) U.S. Cl.
CPC ............ *G02C 7/108* (2013.01); *G02B 1/041* (2013.01); *G02B 1/10* (2013.01); *G02C 7/104* (2013.01)

(58) Field of Classification Search
CPC ........ G02C 7/104; G02C 7/102; G02C 7/105; G02C 7/107; G02C 7/108; G02B 1/041; G02B 1/10; C08L 2666/70
(Continued)

(56) References Cited

U.S. PATENT DOCUMENTS 3,904,420 A    9/1975 Hunter .............................. 430/8
4,211,823 A    7/1980 Suzuki et al. ................ 428/412
(Continued)

FOREIGN PATENT DOCUMENTS

EP    1497375    1/2005
EP    2064585    6/2009
(Continued)

OTHER PUBLICATIONS

Algvere et al., "Age-Related Maculopathy and the Impact of the Blue Light Hazard" *Acta Ophthalmo Scand.*, 84: 4-15, 2006.
(Continued)

*Primary Examiner* — Jordan Schwartz
(74) *Attorney, Agent, or Firm* — Norton Rose Fulbright US LLP (57) ABSTRACT

The present invention relates to a transparent optical article (e.g. an ophthalmic lens) comprising a thermoplastic substrate and a dye at least partially inhibiting light having a wavelength ranging from 400 to 460 nm and an optical brightener for at least partially balancing the color imparted to the transparent optical article by the dye, wherein said optical brightener emits light by fluorescence at a wavelength ranging from 400 to 460 nm and is incorporated into a layer fused or bonded to the thermoplastic substrate. Said optical brightener allows for perception of said optical article as less yellow, and even colorless, to a user or to an
(Continued)

observer. In addition, the UV-absorbers that may be present in the thermoplastic substrate do not negatively interact with the optical brightener.

19 Claims, 2 Drawing Sheets

(58) Field of Classification Search
USPC ........ 351/44, 159.59, 159.6, 159.66; 349/71, 349/106
See application file for complete search history.

(56) References Cited

U.S. PATENT DOCUMENTS

| | | | | |
|---|---|---|---|---|
| 4,304,895 | A | 12/1981 | Loshaek | 526/313 |
| 4,528,311 | A | 7/1985 | Beard et al. | 524/91 |
| 4,989,967 | A | 2/1991 | Matsuda | 351/159.63 |
| 5,827,614 | A | 10/1998 | Bhalakia et al. | 428/411.1 |
| 5,985,389 | A | 11/1999 | Dalton et al. | 428/35.7 |
| 6,328,446 | B1 | 12/2001 | Bhalakia et al. | 351/159.62 |
| 6,534,443 | B2 | 3/2003 | Inuzuka | 503/227 |
| 6,554,873 | B2 | 4/2003 | Inuzuka et al. | 8/471 |
| 6,659,608 | B2 | 12/2003 | Yamamoto et al. | 351/159.56 |
| 6,723,835 | B1* | 4/2004 | Millard | C09B 29/0007 106/31.28 |
| 6,814,896 | B2 | 11/2004 | Bhalakia et al. | 264/1.32 |
| 7,182,997 | B2 | 2/2007 | Murschall et al. | 428/220 |
| 8,360,574 | B2 | 1/2013 | Ishak et al. | 351/159.6 |
| 2003/0020869 | A1 | 1/2003 | Leclaire et al. | 351/159.59 |
| 2003/0165698 | A1 | 9/2003 | Vaneeckhoutte et al. | 428/447 |
| 2004/0029030 | A1* | 2/2004 | Murray | G03G 8/00 430/130 |
| 2008/0127432 | A1 | 6/2008 | Burguiere et al. | 8/507 |
| 2008/0214706 | A1 | 9/2008 | Peter et al. | 524/90 |
| 2009/0047424 | A1 | 2/2009 | Momma | 427/162 |
| 2009/0283924 | A1 | 11/2009 | Jiang et al. | 264/1.7 |
| 2009/0283926 | A1 | 11/2009 | Chiu et al. | 264/1.32 |
| 2012/0184651 | A1 | 7/2012 | Hurst et al. | |
| 2013/0230649 | A1 | 9/2013 | Lim et al. | 427/162 |
| 2013/0244045 | A1 | 9/2013 | Song et al. | 428/447 |
| 2014/0252282 | A1* | 9/2014 | Erkelenz | C08K 3/04 252/587 |
| 2016/0101642 | A1* | 4/2016 | Richert | B41M 3/14 428/328 |

FOREIGN PATENT DOCUMENTS

| | | |
|---|---|---|
| JP | 2000-241601 | 9/2000 |
| JP | 2000-314088 | 11/2000 |
| WO | WO 2007/088312 | 8/2007 |
| WO | WO 2007/096066 | 8/2007 |
| WO | WO 2008/024414 | 2/2008 |
| WO | WO 2009/100195 | 8/2009 |
| WO | WO 2010/109154 | 9/2010 |
| WO | WO 2012/153072 | 11/2012 |
| WO | WO 2013/171434 | 12/2013 |

OTHER PUBLICATIONS

Choukri et al., "White organic light-emitting diodes with fine chromaticity tuning via ultrathin layer position shifting" *Applied Physics Letters*, 89(18): 183513, 2006.

International Search Report and Written Opinion issued in PCT/EP2014/079074, dated Mar. 25, 2015.

International Search Report and Written Opinion issued in PCT/IB2013/003002, dated Aug. 26, 2014.

Kitchel, "The effects of blue light on ocular health", *Journal of Visual Impairment and Blindness*, 94(6), 2000.

* cited by examiner

Figure 4

TRANSPARENT OPTICAL ARTICLE HAVING A REDUCED YELLOWNESS APPEARANCE

CROSS REFERENCE TO RELATED APPLICATIONS

This application is a national phase application under 35 U.S.C. § 371 of international Application No. PCT/IB2013/003002 filed 23 Dec. 2013, the entire contents of which is specifically incorporated by reference herein without disclaimer.

BACKGROUND OF THE INVENTION

1. Field of the Invention

The present invention relates to the optics field, more particularly to transparent optical articles and preferably an ophthalmic lens, maintaining a mostly colorless appearance while comprising an optical filter intended to protect from blue light and optionally from UV light.

2. Description of Related Art

Visible light as perceived by humans approximately extends over a spectrum ranging from a 380 nm wavelength to a 780 nm wavelength. The part of this spectrum, ranging from around 380 nm to around 500 nm, does correspond to a high-energy, essentially blue light.

Many studies (see for example Kitchel E., "The effects of blue light on ocular health», Journal of Visual Impairment and Blindness Vol. 94, No. 6, 2000 or Glazer-Hockstein and al., Retina, Vol. 26, No. 1. pp. 1-4, 2006) suggest that blue light (around 430 nm) has phototoxic effects on human eye health, and especially on the retina.

Indeed, ocular photobiology studies (Algvere P. V. and al., "Age-Related Maculopathy and the Impact of the Blue Light Hazard», Acta Ophthalmo. Scand., Vol. 84, pp. 4-15, 2006) and clinical trials (Tomany S. C. and al., "Sunlight and the 10-Year Incidence of Age-Related Maculopathy. The Beaver Dam Eye Study», Arch Ophthalmol. Vol. 122. pp. 750-757, 2004) demonstrated that an excessively prolonged or intense exposure to blue light may induce severe ophthalmic diseases such as age-related macular degeneration (ARMD) or cataract.

Thus, it is recommended to limit the exposure to blue light potentially harmful, in particular as regards the wavelength band with an increased dangerousness (see especially Table B1, ISO 8980-3 standard:2003 (E) with reference to the B($\lambda$) blue light dangerousness function).

To that end, it may be advisable for a spectacle wearer to wear before each of both eyes an ophthalmic lens which prevents or limits the phototoxic blue light transmission to the retina. Such lenses may also provide increased visual performance due to increased contrast sensitivity.

It has already been suggested, for example in the patent application WO 2008/024414, to cut at least partially the troublesome part of the blue light spectrum from 400 nm to 460 nm by means of lenses comprising a film partially inhibiting the light in the suitable wavelength range, through absorption or through reflection. This can also be done by incorporating a yellow dye into the optical element.

However, blocking blue light affects color balance, color vision if one looks through the optical device, and the color in which the optical device is perceived. Indeed, blue light-blocking optical devices incorporating a dye that at least partially inhibits light having a wavelength ranging from 400 to 460 nm appear yellow, brown or amber. This is esthetically unacceptable for many ophthalmic applications, and may interfere with the normal color perception of the user if the device is an ophthalmic lens.

Efforts have been made to compensate for the yellowing effect of conventional blue blocking filters. For example, blue blocking lenses have been treated with additional dyes, such as blue, red or green dyes, to offset the yellowing effect. However, this technique undesirably reduces the overall transmission of light wavelengths other than blue light wavelengths, which results in light attenuation for a lens user.

In view of the foregoing, there is a need for an optical article capable of at least partially blocking blue light that can further provide acceptable color cosmetics, i.e., that is perceived as mostly colorless by someone observing the optical article. Acceptable overall level of light transmission is also needed, as well as acceptable color perception for a user, i.e., the optical article should not impair dramatically the wearer's color vision in the case of an ophthalmic system. In particular, there is a need for an optical article that allows for selective blockage of wavelengths of blue light while at the same time transmitting at least 80% of visible light.

The present inventors discovered that optical brighteners, also called fluorescent whitening agents (FWA), optical brightening agents (OBA) or fluorescent brightening agents (FBA), could be used as a color balancing means, i.e., to minimize, and preferably eliminate, the change in color perception that results from blue-blocking by a blue light blocking dye incorporated into an optical system, as the blue light emitted by the optical brightener can compensate for the diminishing blue of the material treated by the dye and restore the original colorless appearance.

The present inventors also discovered that UV absorbers, which are frequently incorporated in optical articles substrates in order to reduce or prevent UV light from reaching the retina (in particular in ophthalmic lens materials), could interfere with the ability of optical brighteners to emit light by fluorescence. Therefore, a careful control of the respective locations of the blue light blocking dye, the UV absorber and the optical brightener is necessary to allow said optical brightener for efficiently balancing the color imparted by the dye, while not impairing the original UV blocking function of the optical article.

SUMMARY OF THE INVENTION

To address the needs of the present invention and to remedy to the mentioned drawbacks of the prior art, the applicant provides a transparent optical article comprising a thermoplastic substrate and:

at least one dye A at least partially inhibiting light having a wavelength ranging from 400 to 460 nm, preferably from 420 to 450 nm, and at least one optical brightener B for at least partially balancing the color imparted to the transparent optical article by the dye A, wherein said at least one optical brightener B emits light by fluorescence at a wavelength ranging from 400 to 460 nm, preferably from 420 to 450 nm, and is incorporated into at least one layer L1 fused or bonded to the thermoplastic substrate, and wherein said dye A and said optical brightener B are different from each other.

The combined use of an optical brightener B in layer L1 and a dye A (also referred to as blue light blocking dye or yellow dye in the present specification) in the substrate and/or in at least one layer coated on the substrate of the transparent optical article simultaneously allows to protect the user from blue light and to efficiently mask the yellow color imparted by the dye.

In addition, when the substrate of the optical article comprises UV absorbers, UV protection is also maintained and functioning of the optical brightener is not affected by said UV absorbers.

BRIEF DESCRIPTION OF THE DRAWINGS

The foregoing and other objects, features and advantages of the present invention will become readily apparent to those skilled in the art from a reading of the detailed description hereafter when considered in conjunction with the accompanying drawings, wherein.

DETAILED DESCRIPTION OF THE INVENTION AND PREFERRED EMBODIMENTS

As used herein, when an article comprises one or more layer(s) or coating(s) on the surface thereof, "depositing a layer or a coating onto the article" means that a layer or a coating is deposited onto the uncovered (exposed) surface of the article external coating, that is to say the coating that is the most distant from the substrate.

As used herein, a coating/layer that is "on" a substrate/coating or which has been deposited "onto" a substrate/coating is defined as a coating/layer that (i) is positioned above the substrate/coating, (ii) is not necessarily in contact with the substrate/coating, that is to say one or more intermediate coating(s) may be interleaved between the substrate/coating and the relevant coating/layer (however, it does preferably contact said substrate/coating), and (iii) does not necessarily completely cover the substrate/coating. When "a coating/layer 1 is said to be located under a coating/layer 2", it should be understood that coating/layer 2 is more distant from the substrate than coating/layer 1.

In the present description, an optical article is understood to be transparent when the observation of an image through said optical article is perceived with no significant loss of contrast, that is, when the formation of an image through said optical article is obtained without adversely affecting the quality of the image. This definition of the term "transparent" can be applied to all objects qualified as such in the description.

The transparent optical article according to the invention is preferably an optical lens or lens blank, more preferably an ophthalmic lens or lens blank.

The term "ophthalmic lens" is used to mean a lens adapted to a spectacle frame to protect the eye and/or correct the sight. Said lens can be chosen from afocal, unifocal, bifocal, trifocal and progressive lenses. Although ophthalmic optics is a preferred field of the invention, it will be understood that this invention can be applied to transparent optical elements of other types, such as, for example, lenses for optical instruments, filters particularly for photography or astronomy, optical sighting lenses, ocular visors, optics of lighting systems, etc.

The transparent optical article comprises a thermoplastic substrate and at least one layer coated on the substrate. If it is an optical lens, it may be coated on its convex main side (front side), concave main side (back side), or both sides. The transparent optical article can also be a plano article.

A substrate, in the sense of the present invention, should be understood to mean an uncoated substrate, and generally has two main faces. The substrate may in particular be an optically transparent material having the shape of an optical article, for example an ophthalmic lens destined to be mounted in glasses. In this context, the term "substrate" is understood to mean the transparent base constituent material of the optical lens and more particularly of the ophthalmic lens. This material acts as support for the stack of one or more coatings or layers.

The substrate of the article of the invention is an organic glass made from a thermoplastic material, generally chosen from transparent materials of ophthalmic grade used in the ophthalmic industry.

To be mentioned as especially prefered classes of substrate polymer materials are polycarbonates such as those derived from bisphenol-A, polyamides, polyesters, polyurethanes, polysulfones, amorphous polyolefins, polyethylene, polypropylene, poly(acrylonitrile), poly(vinyl acetate), poly(vinyl chloride), poly(butadiene), cyclic olefin copolymers, polystyrene, poly(meth)acrylic resins such as polymethyl (meth)acrylate, poly(n-butyl methacrylate), poly(isobutyl methacrylate), poly(ethyl methacrylate), polycarbonate/polyester blends, polyvinyl alcohol, polyvinyl formal, cellulose acetate butyrate, polyvinylacetal, saponified (ethylene/vinyl acetate) copolymers, copolymers of any of these, and mixtures of any of these.

The preparation of thermoplastic substrates, e.g., by injecting molten thermoplastic resin into a substrate-forming cavity held closed under a clamp force, is well known to those skilled in the art and is described, for example, in US 2009/283926, US 2009/283924 and U.S. Pat. No. 6,328,446.

Preferably, the thermoplastic substrate of the optical article contains less than 1% by weight of optical brighteners relative to the weight of said substrate, ideally does not contain any optical brightener.

Said thermoplastic substrate generally contains at least one UV absorber, having preferably the ability to at least partially block light having a wavelength shorter than 400 nm, preferably UV wavelengths below 385 or 390 nm. The best UV absorbers do not absorb any substantial amount of visible light.

Said UV absorbers both protect the user's eye from UV light and the substrate material itself, thus preventing it from weathering and becoming brittle and/or yellow.

Polycarbonates are the preferred substrate materials, in particular polycarbonates containing UV absorbers. Polycarbonates that have no UV absorbers will only block light wavelengths below 290 nm.

Suitable UV absorbers include without limitation substituted benzophenones such as 2-hydroxybenzophenone, substituted 2-hydroxybenzophenones disclosed in U.S. Pat. No. 4,304,895, 2-(2-hydroxyphenyl)-benzotriazoles, the 2-hydroxy-5-acryloxyphenyl-2H-benzotriazoles disclosed in U.S. Pat. No. 4,528,311, 2-(3'-methallyl-2'-hydroxy-5'-methyl phenyl) benzotriazole, and allyl hydroxymethylphenyl benzotriazole.

Methods for incorporating UV-absorbers in the substrate of the optical article are well known. This is preferably carried out by mixing the UV absorbers in the thermoplastic substrate composition.

According to the invention, the dye A and the optical brightener B are incorporated into the transparent optical article. Dye A is preferably incorporated into the substrate and/or into at least one layer coated on the substrate. Optical Brightener B is preferably incorporated into at least one layer L1 fused to the thermoplastic substrate, or bonded directly or indirectly generally adhesively to the thermoplastic substrate. In the context of the present invention, "directly" means that there is a direct contact between the materials and a layer that is fused to a substrate is still considered as being coated on the substrate.

In systems according to the invention, the dye A and optical brightener B can be incorporated together in the same layer L1 or separately at different locations, for example in (at least) two different layers L1 and L2, or a combination of these embodiments can be implemented, while still obtaining the advantages and benefits of the invention in terms of health and cosmetic appearance.

Indeed, dye A can be incorporated, without limitation, into the thermoplastic substrate and/or into said at least one layer L1 and/or into at least one layer L2 coated on the thermoplastic substrate that is different from layer L1, while optical brightener B is necessarily incorporated at least into layer L1. When dye A is neither incorporated into the substrate nor into layer L1, it is necessarily incorporated into a L2 layer.

In case the dye and the optical brightener are included in (at least) two different layers, these layers are not necessarily deposited on the same face of the transparent optical article. They can be deposited on either face of the transparent optical article (which may be convex, concave or flat), or on both faces of the transparent optical article. Although layers L1 and L2 (when present) are not necessarily deposited on the same face of the optical article, in a preferred embodiment, the transparent optical article comprises at least one layer L2 (containing at least one dye A) that is coated on the same main surface of the substrate as layer L1. In this case, layer L2 is preferably located under layer L1 in the stacking order, i.e., is interleaved between the thermoplastic substrate and layer L1 and is preferably in direct contact with the substrate and layer L1. However, layer L2 can also be deposited on layer L1.

When the optical article has front and back main surfaces, the layer L1 is preferably formed on the front (convex) main surface of the optical article, which is preferably a lens. So is layer L2, when present. When the optical article has front and back-main surfaces, its back surface is preferably not coated with any layer containing optical brighteners, such as a L1 layer. In the preferred embodiment of the invention, the dye A is incorporated into the thermoplastic substrate and the optical brightener B is incorporated in at least one layer L1 formed on the front main surface of the optical article.

When layer L2 (containing at least one dye A) is present, it is preferably fused or directly bonded (generally adhesively) to the substrate. In this case, layer L1 is considered as being indirectly bonded or fused to the thermoplastic substrate. Said layer L1 is preferably fused or bonded (generally adhesively) to layer L2.

In other embodiments, layer L2 may constitute or be part of, without limitation, a primer coating, a hard coating or an antireflection coating, which will be described later. In this case, layer L2 is preferably a layer or a coating layer deposited over layer L1, or on a main surface of the substrate that does not comprise any layer L1.

When no layer L2 is present, layer L1 is preferably fused or directly bonded to (i.e., in direct contact with) the substrate.

Layer L1 preferably has a thickness lower than or equal to 2 mm, more preferably lower than or equal to 1 mm, even better ranging from 100 to 500 µm. When present, layer L2 preferably has a thickness lower than or equal to 2 mm, more preferably lower than or equal to 1 mm, even better ranging from 100 to 500 µm.

Preferably, layer L1 contains less than 1% by weight of UV absorbers relative to the weight of said layer, ideally does not contain any UV absorber. Preferably, layer L2 contains less than 1% by weight of UV absorbers relative to the weight of said layer, ideally does not contain any UV absorber. It is crucial for layer L1 or other layers incorporating the optical brightener to contain little or no UV absorber, in order for the optical brightener to be able to efficiently balance the color imparted by the dye without suffering from "interferences" caused by the presence of an UV absorber in its close environment. On the contrary, a layer L2 incorporating the blue light blocking dye can comprise UV absorbers.

Several dyes and/or several optical brighteners can be incorporated in the substrate and/or the same or different layers deposited at the surface of the substrate.

In some applications, it is preferred that the substrate's main surface, coated with layer L1 and, when present, layer L2, be further coated with one or more functional coating(s) to improve the optical and/or mechanical properties. The term "coating" is understood to mean any layer, layer stack or film which may be in contact with the substrate and/or with another coating, for example a sol-gel coating or a coating made of an organic resin. A coating may be deposited or formed through various methods on layer L1 or, when present, layer L2, including wet processing, gaseous processing, and film transfer. These functional coatings classically used in optics may be, without limitation, an impact-resistant and/or adhesion primer, an abrasion-resistant and/or scratch-resistant coating, an anti-reflection coating, a polarized coating, a photochromic coating, or an antistatic coating, or a stack made of two or more such coatings, especially an impact-resistant primer coating coated with an abrasion and/or scratch-resistant coating.

Abrasion- and/or scratch-resistant coatings (hard coatings) are preferably hard coatings based on poly(meth)acrylates or silanes. Recommended hard abrasion- and/or scratch-resistant coatings in the present invention include coatings obtained from silane hydrolyzate-based compositions (sol-gel process), in particular epoxysilane hydrolyzate-based compositions such as those described in the US patent application US 2003/0165698 and in U.S. Pat. No. 4,211,823.

The primer coatings improving the impact resistance and/or the adhesion of the further layers in the end product are preferably polyurethane latexes or acrylic latexes. Primer coatings and abrasion-resistant and/or scratch-resistant coatings may be selected from those described in the application WO 2007/088312. The primer coating generally promotes adhesion of the hard coating to the substrate.

The antireflection coating, which improves the antireflective properties of the final optical article by reducing the light reflection at the article-air interface over a relatively large range of the visible spectrum, may be any antireflection coating classically used in the optics field, in particular in ophthalmic optics. As is well known, antireflective coatings traditionally comprise a monolayered or a multilayered stack composed of dielectric or sol-gel materials. These are preferably multilayered coatings, comprising layers with a high refractive index (HI, $n > 1.5$) and layers with a low refractive index (LI, $n \leq 1.5$).

The structure and preparation of antireflection coatings are described in more details in patent application WO 2010/109154 and WO 2012/153072.

Coatings such as primers, hard coats and antireflection coatings according to the invention may be deposited using methods known in the art, including spin-coating, dip-coating, spray-coating, evaporation, sputtering, chemical vapor deposition and lamination.

The three preferred embodiments of the invention and methods for manufacturing the corresponding optical articles will now be described in detail.

In a first preferred embodiment of the invention, the transparent optical article comprises a thermoplastic substrate into which the blue light blocking dye A is incorporated while optical brightener B is incorporated into layer L1.

In a second preferred embodiment of the invention, the transparent optical article comprises a thermoplastic substrate, at least one layer L2 and at least one layer L1 coated on the substrate in this order, wherein the dye A is incorporated into said at least one layer L2 and the optical brightener B is incorporated into said at least one layer L1.

In a third preferred embodiment of the invention, the transparent optical article comprises a thermoplastic substrate and at least one layer L1 coated on the substrate, wherein both the dye A and the optical brightener B are incorporated into said at least one layer L1.

In these three embodiments, layers L1 and L2 are preferably applied onto the substrate of the optical article as preformed molded wafers, such as described below.

The dye can be incorporated into the substrate by methods well known in the art, for example:
I. impregnation or imbibition methods consisting in dipping the substrate in an organic solvent and/or water based hot coloration bath, preferably a water based solution, for several minutes. Substrates such as organic lens substrates are most often colored in the bulk of the material by dipping in aqueous coloration baths, heated to temperatures of the order of 90° C., and in which the dye has been dispersed. The dye thus diffuses under the surface of the substrate and the color density is obtained by adjusting the quantity of dye diffusing in the body of the substrate,
II. the diffusion methods described in JP 2000-314088 and JP 2000-241601, involving an impregnable temporary coating,
III. contactless coloration using a sublimable material, such as described in U.S. Pat. No. 6,534,443 and U.S. Pat. No. 6,554,873, or
IV. incorporation of a blue-absorbing dye during the manufacture of the substrate itself, for example by casting or injection molding, if the dye is sufficiently resistant to high temperatures present during casting or injection molding.

Several methods familiar to those practiced in the art of optical manufacturing are known for incorporating the dye (and/or the optical brightener) in a layer L1 and/or L2 (or in a preformed film, herein called "wafer"). The blue light blocking dye may be deposited at the same time as the layer, i.e., when the layer is prepared from a liquid coating composition, the dye can be incorporated (directly or for example as dye-impregnated particles) or dissolved in said coating composition before it is applied (in situ mixing) and hardened at the surface of the substrate.

The dye (and/or the optical brightener) may also be included in a coating in a separate process or sub-process. For example, the dye may be included in the coating after its deposition at the surface of the substrate, using a dipping coloration method similar to that referred to for coloring the substrate, i.e., by means of tinting bath at elevated temperatures, through the diffusion method disclosed in US 2003/0020869, in the name of the applicant, through the method disclosed in US 2008/127432, in the name of the applicant, which uses a printing primer that undergoes printing using an inkjet printer, through the method disclosed in US 2013/244045, in the name of the applicant, which involves printing with a sublimation dye by means of a thermal transfer printer, or though the method disclosed in US 2009/047424, in the name of the applicant, which uses a porous layer to transfer a coloring agent in the substrate. The dye may also be sprayed onto a surface before the coating is cured (e.g., thermally or UV cured), dried or applied.

When implementing ink jet printing, it is generally necessary to modify the surface of the article to receive the ink, typically by applying an ink receptive coating on the surface of the article. The ink receptive coating may be a permanent tintable coating or a temporary tintable coating being used as a temporary support from which the dyes are transferred into the article. The dyes may be transferred in the substrate itself or in a coating of the substrate, adjacent to the ink receptive coating. Ink jet printing for tinting a substrate or coating is described with more details in US 2013/0230649, in the name of the applicant.

The methods for incorporating an optical brightener B into a substrate or coating are generally the same as those disclosed for the incorporation of dyes. Obviously, combinations of several of the methods described herein can be used to obtain a transparent optical article having a dye A and an optical brightener B incorporated therein.

Layers L1 and/or L2 containing dye A and/or optical brightener B can also be formed as films or thin wafers that will be subsequently transferred, laminated, fused or glued to the substrate. This is the preferred embodiment for obtaining a substrate coated with layers L1 and/or L2.

When layer L1 (or layer L2) is fused to the substrate of the optical article, the substrate and layer L1 (or layer L2) are preferably formed of the same polymer material (preferably polycarbonate), in order to more easily obtain a permanent contact between the substrate and the layer. Both materials should at least be compatible with each other. However, when layer L1 or L2 is adhesively bonded to the substrate, there is no requirement to use the same material in the layer and the substrate.

One preferred method for applying layer L1 or L2 to the substrate is the post-injection press lamination process, which is a method for laminating a film onto an injection molded thermoplastic substrate that resides in an injection molding machine. It involves forming a film or wafer containing the dye and/or the optical brightener in a first step, preferably by molding a wafer such as a polycarbonate wafer, and then gluing said wafer to the substrate using the method disclosed in US 2009/283926. This technique involves depositing an unpressurized full metered charge of curable glue or adhesive onto the center of a substrate, just after the preparation of said substrate by injection molding, while the substrate still resides in the injection molding machine. Then, the wafer is introduced between the glue and an insert of the machine, the mold is closed, and a clamp force is applied to thinly spread the glue between the wafer and the substrate. The glue, which is preferably an acrylate based glue, can be cured using the heat transferred from the mold and the diminishing residual heat of the substrate, and provides an adhesive layer that bonds the wafer to the substrate. The glue could also be deposited on the surface of the wafer to be glued on the substrate. With a proper choice of the glue or adhesive, a strongly bonded layer L1 or L2/substrate interface can be obtained even if the layer material is different from the substrate resin. In this method, the dye or the optical brightener can also be blended into the curable glue (thus forming, after curing, a cured glue L1 or L2 layer), and the applied wafer can be a functional film.

US 2009/283924, in the name of the applicant, discloses a variant of this technique using a hot melt adhesive rather than a curable glue, said hot melt being applied as a uniformly thin layer onto the film/wafer before loading the film/wafer inside the injection molding machine. The diminishing residual heat of the substrate present in the injection molding machine and the pressure applied causes the film/wafer to be intimately bonded to the substrate. In this method, the dye or the optical brightener can also be blended into the hot melt adhesive, and the applied wafer can be a functional film.

Another method for applying layer L1 or L2 to the substrate is an overmolding method called film insert molding (FIM), which injects molten thermoplastic resin against the surface of a preformed film or wafer (preferably formed by molding) to create a fused bonding between the lens and the film/wafer. The method of molding said resin onto the film/wafer involves placing the film/wafer containing the dye and/or the optical brightener into the empty cavity of the injection molding machine. The molten thermoplastic resin is then injected into the mold cavity and against the film/wafer and injection molded so that the high temperature melts the facing layer of the film/wafer, causing it to fuse to the subsequently solidified optical article's substrate. This technique is described, for example, in U.S. Pat. Nos. 5,827,614, 6,328,446, 6,814,896 and 6,659,608 and requires that the material of the applied film/wafer and the material of the substrate be the same or compatible with each other, so as to obtain an efficient fusion of the materials.

The amount of optical brightener used in the present invention is an amount sufficient to provide a transparent optical article that does not have a yellow appearance, while the amount of dye used in the present invention is an amount sufficient to provide a satisfactory protection from blue light.

The amount of optical brightener incorporated into a layer coated on (or fused to) the substrate is preferably lower than 200 ppm relative to the weight of said layer, more preferably lower than 50 ppm.

When incorporated into the substrate, the blue light blocking dye is used in an amount lower than 50 ppm relative to the weight of said substrate, preferably lower than or equal to 5 ppm.

When incorporated into a layer coated on the substrate (such as a L1 or L2 layer), the blue light blocking dye is used in an amount lower than 5000 ppm relative to the weight of said layer, preferably lower than 500 ppm.

Naturally, the respective amounts of optical brightener and blue light blocking dye have to be adapted to each other to produce a transparent, colorless element. In particular, those of skill in the art should appreciate that the desired amount of optical brightener will vary depending on several factors including the nature and amount of the dye which is used. To this end, the optimal amounts of each compound can be determined by simple laboratory experiments.

Obviously, the transparent optical article according to the invention can only appear colorless if neither of its substrate and coatings is tinted.

As used herein, a dye may refer to both a pigment and a colorant, i.e., can be soluble or insoluble in its vehicle. It may be used singly or in combination.

The chemical nature of the dye A is not particularly limited, provided that it has an absorption peak, ideally a maximum absorption peak, within the 400-460 nm range, preferably the 420-450 nm range. Preferably, dye A acting as a means for at least partially inhibiting light having a wavelength ranging from 400 to 460 nm selectively inhibits light within the 400 nm-460 nm range, and more preferably within the 420 nm-450 nm range. As used herein, a means "selectively inhibits" a wavelength range if it inhibits at least some transmission within the range, while having little or no effect on transmission of visible wavelengths outside the wavelength range.

The one or more dyes incorporated in the transparent optical article preferably absorb radiation such that they inhibits from 1 to 50% of the light having a wavelength ranging from 400 to 460 nm, more preferably from 10 to 40%, ideally from 10 to 30%. They preferably inhibit from 1 to 50% of the light having a wavelength ranging from 420 to 450 nm, more preferably from 10 to 40%, ideally from 10 to 30%. These absorptions can be controlled by dye concentration and are measured relative to the amount of light that would be transmitted at the same wavelengths in the absence of the dyes.

The blue light blocking dye may be chosen, without limitation to these families, from the perylene, coumarin, porphyrin, acridine, indolenin (which is a synonym for 3H-indole) and indol-2-ylidene families.

Preferred blue light blocking dyes have a narrow absorption band in the 400-460 nm range of the electromagnetic spectrum, preferably at 420-450 nm. Ideally, said absorption band is centered on around 430 nm.

The most preferred dye according to the invention is perylene, which exhibits ideal spectral characteristics and interesting injection processability properties. Indeed, perylene is a selective yellow dye, which does not absorb, or very little, in regions of the visible spectrum outside the 400-460 nm wavelength range.

As well known, optical brighteners are substances that absorb light in the UV and violet region (usually at 340-370 nm) and re-emit light by fluorescence mainly in the blue region of the visible spectrum. They may be used singly or in combination.

The chemical nature of the optical brightener is not particularly limited, provided that it is capable of emitting light by fluorescence, ideally a maximum fluorescence, at a wavelength ranging from 400 to 460 nm, preferably from 420 to 450 nm.

Preferably, the optical brightener absorbs less than 30% of the light having a wavelength ranging from 400 to 460 nm, more preferably less than 20%, even more preferably less than 10%, ideally less than 5%. It preferably absorbs less than 30% of the light having a wavelength ranging from 420 to 450 nm, more preferably less than 20%, even more preferably less than 10%, ideally less than 5%. Said optical brightener preferably has no maximum absorption peak, even better no absorption peak, within the 400-460 nm range, preferably the 420-450 nm range.

The optical brightener may be chosen, without limitation to these families, from stilbenes, carbostyrils, coumarins, 1,3-diphenyl-2-pyrazolines, naphthalimides, combined heteroaromatics (such as pyrenyl-triazines or other combinations of heterocyclic compounds such as thiazoles, pyrazoles, oxadiazoles, fused polyaromatic systems or triazines, directly connected to each other or through a conjugated ring system) benzoxazoles, in particular benzoxazoles substituted at the 2-position with a conjugated ring system, preferably comprising ethylene, phenylethylene, stilbene, benzoxazole and/or thiophene groups. Preferred families of optical brighteners are bis-benzoxazoles, phenylcoumarins, methylcoumarins and bis-(styryl)biphenyls, which are described in more details in A. G. Oertli, Plastics Additives Handbook, 6th Edition, H. Zweifel, D. Maier, M. Schiller Editors, 2009.

Specific examples of commercially available bis-benzoxazole optical brighteners are Eastobrite® compounds from Eastman Chemical, such as Eastobrite® OB, Eastobrite® OB-1 and Eastobrite® OB-3, Hostalux® compounds from Clariant, such as Hostalux ACK, Hostalux CP01, Hostalux EBU, Hostalux EF, Hostalux ERE, Hostalux EREN, Hostalux ES2R, Hostalux ESR, Hostalux ETB 300, Hostalux ETBN, Hostalux KCB, Hostalux KS, Hostalux KS1B, Hostalux KSB3, Hostalux KSC, Hostalux KSN, Hostalux NR, Hostalux NSM, Hostalux PFC, Hostalux PFCB, Hostalux PN, Hostalux PNB, and Hostalux PR, Whitefluor® compounds (styril-bis-benzoxazoles) from Sumitomo Chemical Co., such as Whitefluor® B, Whitefluor® PEN, Whitefluor® PHR, Whitefluor® HCS, Whitefluor® PCS.

Specific examples of commercially available methylcoumarin optical brighteners are Eccowhite® compounds from Eastern Color & Chemical Co., such as Eccowhite 1132 MOD, Eccowhite 2013, Eccowhite 2790, Eccowhite 5261, Eccowhite AEA-HF, Eccowhite Nylon FW, Eccowhite OP, Eccowhite PSO, Eccowhite DM-04 MOD.

Another useful category of optical brighteners is the Tinopal® family from BASF, which comprises both bis-benzoxazole and bis-(styril)biphenyl compounds, such as Tinopal ABP-A, Tinopal ABP-X, Tinopal ASP, Tinopal BPO, TinopalEC, Tinopal HST, Tinopal HW, Tinopal MSP, Tinopal NP, Tinopal SPP-N, Tinopal SPP-Z, Tinopal UP HC DD, Tinopal UP, Tinopal CBS-X and Tinopal® OB.

Other useful optical brighteners that may be used in the present invention are described in Fluorescent Whitening agents, Anders G. EQS, Environmental quality and safety (Suppl. Vol IV) Georg Thieme Stuttgart 1975.

Preferred optical brighteners have a high fluorescence efficiency, i.e., re-emit as visible light a major proportion of the energy they have absorbed.

The most preferred optical brightener are:
2,2'-(1,2-ethylenediyldi-4,1-phenylene) bisbenzoxazole, marketed by Eastman Chemical under the trade name Eastobrite® OB-1, having the following structure:

2,5-thiophenediylbis(5-tert-butyl-1,3-benzoxazole), marketed by BASF under the tradename Tinopal® OB, having the following structure:

According to the invention, a particular yellow dye is associated to an optical brightener having a fluorescence emission that will best match the absorption spectrum of said dye, and vice versa. The nature of the dye and optical brightener allow adjustment of the absorption/emission peak positions.

In a preferred embodiment, the transparent optical article according to the invention includes a dye A and an optical brightener B such that the difference (expressed in absolute value) between the maximal absorption value λmax (A) of dye a and the maximal fluorescence emission value λmax (B) of the optical brightener B is lower than 15 nm, more preferably lower than 10 nm and ideally lower than 5 nm. In the context of the present application, λmax (A) and λmax (B) are measured in dichloromethane.

The combination of perylene as a blue light blocking dye and 2,5-thiophenediylbis(5-tert-butyl-1,3-benzoxazole) (Tinopal® OB) as an optical brightener is particularly preferred, because the fluorescence properties of the latter perfectly match the absorption spectrum of perylene. The wavelength of maximum fluorescence emission of Tinopal® OB is 432 nm, while perylene has an absorption maximum at 434 nm.

The transparent optical article according to the invention has improved color properties that can be quantified by the whiteness index Wi and the yellowness index Yi.

The evaluation of the whitening effect of the optical brightener B, in other words, the degree of whiteness of the inventive transparent optical article, may be carried out by means of colorimetric measurements, based on the CIE tristimulus values X, Y, Z such as described in the standards ASTM E313-73 (1993) and ASTM D 1925-70 (1988). The transparent optical article according to the invention preferably has a high whiteness index Wi, i.e., higher than 40, as measured according to ASTM E-313-73. Wi is calculated by the equation of Taube (Wi=4B−3G, the parameters B (blue) and G (green) being determined from the tristimulus values X, Y, Z with G=Y and B=0.847 Z).

The transparent optical article according to the invention preferably has a low yellowness index Yi, i.e., lower than 10, more preferably lower than 5, as measured according to ASTM D-1925. Yi can be determined from the CIE tristimulus values X, Y, Z through the relation: Yi=128X−106Z/Y.

The transparent optical article according to the invention preferably has a relative light transmission factor in the visible spectrum Tv higher than 80%, more preferably higher than 85%. The Tv factor is such as defined in the standard NF EN 1836 and corresponds to the 380-780 nm wavelength range.

Now, the present invention will be described in more detail with reference to the following examples, which are provided for illustrating purposes only.

EXAMPLES

I. Preparation of the Lenses

Perylene was used as dye A, while Tinopal® OB was used as optical brightener B. The lenses were prepared using the overmolding method disclosed in U.S. Pat. No. 6,328,446, using two different polycarbonate materials, compatible with each other. Firstly, a 900 μm thick wafer of polycarbonate (Makrolon 3158, from Bayer, containing no UV absorber) was placed in the empty cavity of the mold of an Arburg 320 injection molding machine, so as to expose the concave surface of said wafer. The wafer (76 mm diameter, 0.9 mm Center Thickness, with base curve 6) had been previously surfaced from a plano lens. Then, Panlite 1250ZT resin from Teijin was injected into the mold cavity against the concave surface of the wafer. Said resin is a standard ophthalmic polycarbonate including an UV absorber. Injection molding was then carried out according to conditions well known by the skilled artisan.

Lenses (76 mm diameter, 1.8 mm Center Thickness, with base curve 6) were obtained having a polycarbonate wafer fused to the convex surface of the lens substrate.

In example 1, L1 wafer was prepared from Makrolon 3158 and further contained 12.5 ppm by weight of optical brightener Tinopal® OB, then Panlite 1250ZT polycarbonate substrate containing 5 ppm by weight of perylene was overmolded on the wafer L1.

In the comparative examples, lenses were molded in a single step. Additives were added directly in the polycarbonate (Panlite 1250ZT substrate, further containing 4 ppm of perylene in comparative example 2, 4 ppm of perylene and 25 ppm of Tinopal® OB in comparative example 3).

The constitution of the prepared lenses is summarized in Table 1:

TABLE 1

| Example | Substrate | Layers |
| --- | --- | --- |
| Comparative example 1 | PC | None |
| Comparative example 2 | PC + 4 ppm Dye | None |
| Comparative example 3 | PC + 4 ppm Dye + 25 ppm Optical brightener | None |
| Example 1 | PC + 5 ppm Dye | Layer L1 (PC + 12.5 ppm Optical brightener) |

II. Evaluation of the Optical Properties

The whiteness index Wi of the prepared lenses were calculated by measuring on a white background with an UltraScan Pro spectrophotometer from Hunter the CIE tristimulus values X, Y, Z such as described in the standards ASTM E313-73 (1993) and ASTM D 1925-70 (1988), through reflection measures, with the front (convex) side of the lens facing the detector and light incoming on said front side. This way of measuring Wi, from an observer's view angle, is the closest to the actual wearing situation.

The light transmission factor in the visible spectrum Tv was measured in transmission mode from a wearer's view angle using the above spectrophotometer, with the back (concave) side of the lens facing the detector and light incoming on the front side of the lens.

Both Tv and Wi were measured under D65 illumination conditions (daylight).

It has been chosen to use perylene at a concentration where it absorbs around 9.8% of radiation having a wavelength of 430 nm (as compared to the same lens without the dye), which has been shown to be sufficient to prevent adverse effects of conditions such as atrophic age-related macular degeneration. Such absorption was quantified by calculating light cut (%) at 430 nm for each prepared lens based on the following equation:

$$LightCut\ (\%) = \frac{T\%(ref) - T\%}{T\%(ref)}$$

wherein, T % (ref) is the light transmission (%) at 430 nm of the reference lens of comparative example 1 (neither comprising a dye nor an optical brightener), and T % is the light transmission (%) at 430 nm of the lens under measurement.

III. Results

The optical properties of lenses mentioned above are summarized in Table 2.

TABLE 2

| Example | Transmission at 430 nm (%) | Light cut at 430 nm (%) | Wi (in white background) | UV cut-off |
| --- | --- | --- | --- | --- |
| Comparative example 1 | 88.6 | 0 | 66.9 | 390 nm |
| Comparative example 2 | 79.9 | 9.8 | 48.5 | 390 nm |
| Comparative example 3 | 79.9 | 9.8 | 48.6 | 395 nm |
| Example 1 | 79.8 | 9.9 | 56.2 | 395 nm |

As shown by the exemplary data described above, a system according to the present invention selectively inhibits UV light and blue light, i.e., specifically reduces the light received by the eye in the 400 nm-460 nm region and almost inhibits wavelengths under 395 nm, while having an improved white appearance and still providing a luminous transmission of at least about 80% at 430 nm.

The whiteness index of the lenses of example 1 is higher than that of the lens of comparative example 3, in which the optical brightener is incorporated in the lens substrate rather than layer L1. Light transmission curves of lenses according to the invention show a higher transmission in the deep blue colors, as compared to standard lenses of comparative examples 2 and 3.

Comparison of comparative examples 2 and 3 reveals that UV absorbers present in the ophthalmic lens substrate suppress the ability of the optical brightener to emit light by fluorescence at a wavelength ranging from 400 to 460 nm. Indeed, incorporating an optical brightener in the substrate of the lens of comparative example 2 fails to significantly improve the witheness index of said lens. Without wishing to be bound by any theory, the inventors believe that this is due to the fact that UV light is absorbed by the UV absorbers and can no longer trigger the fluorescence emission of the optical brightener when present in the same layer as the UV absorber.

Figure 1:
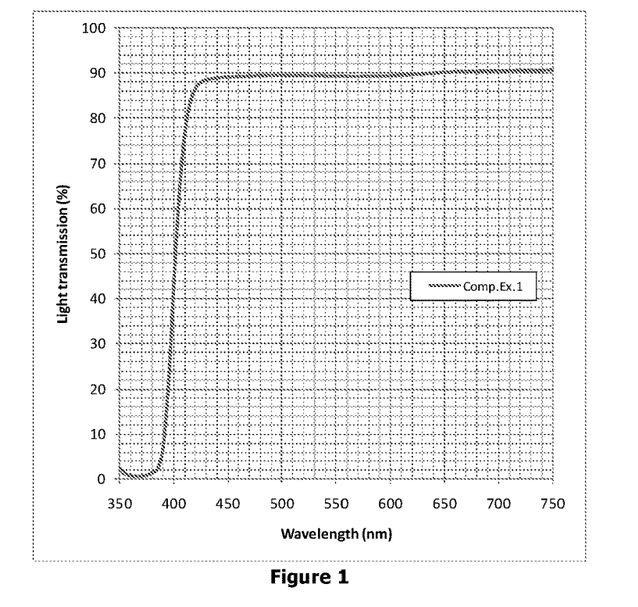
FIGS. 1-4 depict the light transmission curves between 350 and 750 nm of various lenses and comparative lenses described in the experimental part (respectively the lenses of comparative examples 1, 2 and 3 and the lens of example 1).
Figure 2:
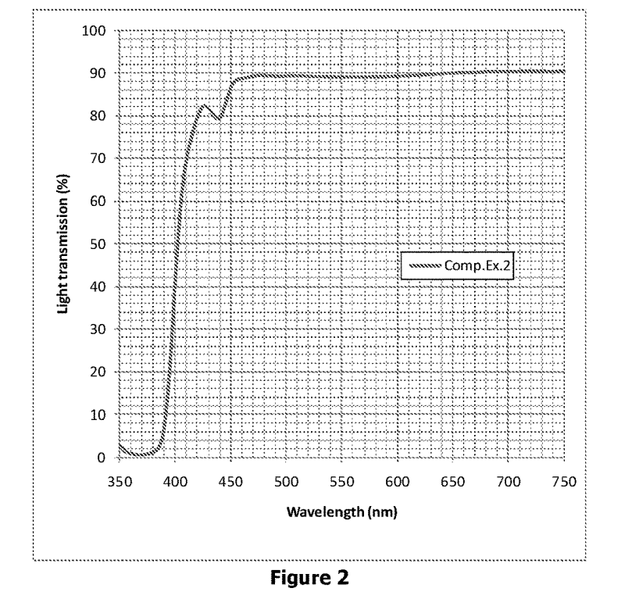
Figure 3:
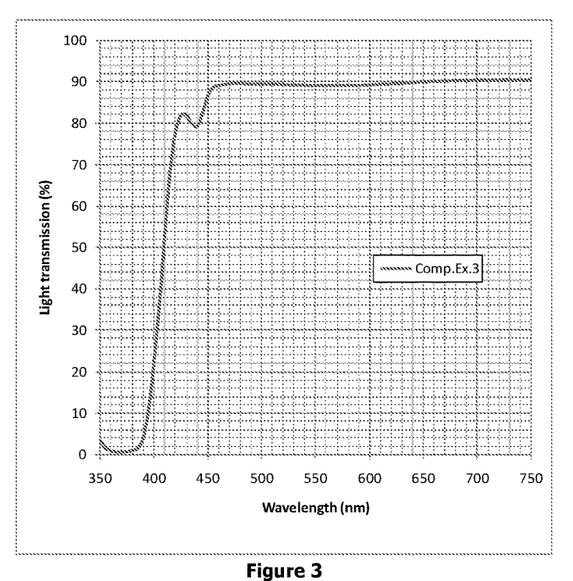
Figure 4:
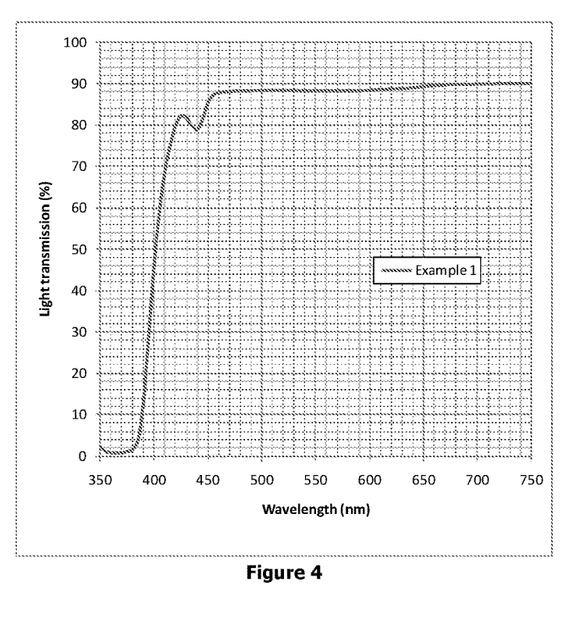

As can be seen on FIGS. 1-4, all lenses, except the one without any dye incorporated therein (comparative exemple 1), have similar blue light cut levels of ca. 10% at 430 nm, in the presence or absence of an optical brightener. UV cut-off wavelength, as defined by the wavelength below which light transmission is lower than 10%, ranges from 390-395 nm in all the lenses evaluated (see FIGS. 1-4), due to the presence of UV absorbers in the polycarbonate lens substrate.

The invention claimed is:

1. An optical lens comprising a thermoplastic substrate having a weight and front and back main surfaces and:
   at least one dye A at least partially inhibiting light transmission for at least one wavelength ranging from 400 to 460 nm; and
   at least one optical brightener B for at least partially balancing the color imparted to the optical lens by the dye A;
wherein:
   the at least one optical brightener B emits light by fluorescence at at least one wavelength ranging from 400 to 460 nm, and is incorporated into at least one layer L1 fused or bonded to the thermoplastic substrate and having a weight;
   the dye A and the optical brightener B are different from each other; and the dye A is incorporated into the thermoplastic substrate and the optical brightener B is incorporated in the at least one layer L1, which is formed on the front main surface of the lens.

2. The optical lens of claim 1, wherein the dye A further is incorporated into layer L1 and/or the dye A further is incorporated into at least one layer L2 coated on the thermoplastic substrate that is different from layer L1.

3. The optical lens of claim 1, wherein the dye A further is incorporated into at least one layer L2 coated on the thermoplastic substrate that is different from layer L1 and said layer L2 is interleaved between layer L1 and the thermoplastic substrate.

4. The optical lens of claim 1, wherein the dye A at least partially inhibits light transmission for at least one wavelength ranging from 420 to 450 nm.

5. The optical lens of claim 1, wherein the optical brightener B emits light by fluorescence at at least one wavelength ranging from 420 to 450 nm.

6. The optical lens of claim 1, wherein the layer L1 has a thickness lower than or equal to 2 mm.

7. The optical lens of claim 1, further defined as having a relative light transmission factor in the visible spectrum Tv higher than 80%.

8. The optical lens of claim 1, wherein the dye A is a member of one of the perylene, coumarin, porphyrin, acridine, indolenin, or indole-2-ylidene families.

9. The optical lens of claim 1, wherein the optical brightener B is one of a stilbene, carbostyril, coumarin, 1,3-diphenyl-2-pyrazoline, naphthalimide, or benzoxazole.

10. The optical lens of claim 9, wherein the optical brightener B is one of a bis-benzoxazole, phenylcoumarin, methylcoumarin, or bis-(styryl)biphenyl.

11. The optical lens of claim 1, wherein the at least one dye A inhibits from 1 to 50% of light transmission for at least one wavelength ranging from 420 to 450 nm.

12. The optical lens of claim 1, wherein the dye A is incorporated into the thermoplastic substrate in an amount lower than 50 ppm relative to the weight of the thermoplastic substrate.

13. The optical lens of claim 2, wherein the dye A further is incorporated into layer L1 in an amount lower than 5000 ppm relative to the weight of the layer, or is further incorporated into layer L2 in an amount lower than 5000 ppm relative to the weight of the layer.

14. The optical lens of claim 13, wherein the dye A further is incorporated into layer L1 in an amount lower than 500 ppm relative to the weight of the layer, or is further incorporated into layer L2 in an amount lower than 500 ppm relative to the weight of the layer.

15. The optical lens of claim 1, wherein the optical brightener B is incorporated into layer L1 in an amount lower than 200 ppm relative to the weight of the layer.

16. The optical lens of claim 1, further defined as having a yellowness index Yi lower than 10.

17. The optical lens of claim 16, further defined as having a yellowness index Yi lower than 5.

18. The optical lens of claim 1, further defined as having a whiteness index Wi higher than 40.

19. The optical lens of claim 1, wherein the difference, expressed in absolute value, between the maximal absorption value $\lambda\max$ (A) of dye A and the maximal fluorescence emission of value $\lambda\max$ (B) of the optical brightener B is lower than 15 nm.

* * * * *

UNITED STATES PATENT AND TRADEMARK OFFICE
CERTIFICATE OF CORRECTION

PATENT NO.       : 10,114,234 B2
APPLICATION NO.  : 15/107743
DATED            : October 30, 2018
INVENTOR(S)      : Aref Jallouli, Haifeng Shan and Gilles Baillet It is certified that error appears in the above-identified patent and that said Letters Patent is hereby corrected as shown below:

In the Claims

Claim 2, Column 15, Line 5:
Delete "further is" and replace with -- is further --.

Claim 2, Column 15, Line 6:
Delete "further is" and replace with -- is further --.

Claim 3, Column 15, Line 9:
Delete "further is" and replace with -- is further --.

Claim 13, Column 16, Line 8:
Delete "further is" and replace with -- is further --.

Claim 14, Column 16, Line 13:
Delete "further is" and replace with -- is further --.

Signed and Sealed this
Twenty-ninth Day of January, 2019

Andrei Iancu
*Director of the United States Patent and Trademark Office*